United States Patent
Tokozakura et al.

(10) Patent No.: US 10,443,703 B2
(45) Date of Patent: Oct. 15, 2019

(54) LUBRICATION CONTROL DEVICE FOR TRANSMISSION

(71) Applicant: TOYOTA JIDOSHA KABUSHIKI KAISHA, Toyota-shi (JP)

(72) Inventors: Daisuke Tokozakura, Susono (JP); Kazuya Arakawa, Fujinomiya (JP); Takahiro Shiina, Numazu (JP); Satoshi Tominaga, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 344 days.

(21) Appl. No.: 15/503,644

(22) PCT Filed: Aug. 20, 2015

(86) PCT No.: PCT/IB2015/001398
§ 371 (c)(1),
(2) Date: Feb. 13, 2017

(87) PCT Pub. No.: WO2016/027151
PCT Pub. Date: Feb. 25, 2016

(65) Prior Publication Data
US 2017/0241538 A1    Aug. 24, 2017

(30) Foreign Application Priority Data
Aug. 22, 2014    (JP) .................................. 2014-169883

(51) Int. Cl.
*F16H 57/04*    (2010.01)

(52) U.S. Cl.
CPC ..... *F16H 57/0413* (2013.01); *F16H 57/0417* (2013.01); *F16H 57/0434* (2013.01); *F16H 57/0435* (2013.01); *F16H 57/0475* (2013.01)

(58) Field of Classification Search
CPC ............. F16H 57/0413; F16H 57/0434; F16H 57/0435; F16H 57/0475
See application file for complete search history.

(56) References Cited

U.S. PATENT DOCUMENTS

| | | | | |
|---|---|---|---|---|
| 2,540,629 A | * | 2/1951 | Miller ................... | F01M 5/007 165/280 |
| 4,566,530 A | * | 1/1986 | Gooden ............. | G05D 23/1925 137/625.64 |

(Continued)

FOREIGN PATENT DOCUMENTS

| | | |
|---|---|---|
| JP | 6-94106 A | 4/1994 |
| JP | 2000-234669 A | 8/2000 |
| JP | 2002-266993 A | 9/2002 |

OTHER PUBLICATIONS

International Search Report dated Jan. 22, 2016, in PCT/IB2015/001398 filed Aug. 20, 2015.

*Primary Examiner* — Michael A Riegelman
(74) *Attorney, Agent, or Firm* — Oblon, McClelland, Maier & Neustadt, L.L.P.

(57) ABSTRACT

A lubrication control device for a transmission includes an oil pump, a heat exchanger, an oil quantity control valve, a first bypass oil passage, and an electronic control unit. The heat exchanger is connected between the oil pump and a lubricated portion of the transmission. The oil quantity control valve includes an inflow port, a supply port, and a discharge port. The supply port is connected to the heat exchanger. The oil quantity control valve is configured to control a supply oil quantity as a flow rate of the oil flowing from the inflow port to the supply port and discharge a residue of the oil from the discharge port. The first bypass oil passage is connected to the discharge port. The electronic control unit is configured to adjust the oil quantity control (Continued)

valve such that the supply oil quantity increases as a temperature of the oil increases.

6 Claims, 10 Drawing Sheets

(56) References Cited

U.S. PATENT DOCUMENTS

| | | | | |
|---|---|---|---|---|
| 4,637,454 | A * | 1/1987 | Lowes | G05D 23/1919 |
| | | | | 165/253 |
| 5,217,085 | A * | 6/1993 | Barrie | F01M 1/16 |
| | | | | 165/297 |
| 5,666,807 | A * | 9/1997 | Bianchetta | F15B 21/042 |
| | | | | 165/280 |
| 8,517,039 | B2 * | 8/2013 | Seid | F16H 59/72 |
| | | | | 137/2 |
| 8,869,940 | B2 * | 10/2014 | Johnson | F16N 7/40 |
| | | | | 184/6.12 |
| 10,260,824 | B2 * | 4/2019 | Brinkley | F28F 27/02 |
| 2002/0128107 | A1 * | 9/2002 | Wakayama | F16H 57/0412 |
| | | | | 475/161 |
| 2013/0092349 | A1 * | 4/2013 | Curtis | F16H 57/0413 |
| | | | | 165/51 |
| 2013/0152882 | A1 * | 6/2013 | Potter | F16H 57/0413 |
| | | | | 123/41.33 |
| 2017/0175612 | A1 * | 6/2017 | Tokozakura | F01P 3/18 |
| 2017/0241538 | A1 * | 8/2017 | Tokozakura | F16H 57/0413 |
| 2017/0328351 | A1 * | 11/2017 | Zhang | F03D 80/60 |
| 2018/0100711 | A1 * | 4/2018 | Bonkoski | F28D 20/02 |
| 2018/0187771 | A1 * | 7/2018 | Somers | F16H 57/0435 |
| 2018/0347691 | A1 * | 12/2018 | Wurster | B60T 10/02 |

* cited by examiner

LUBRICATION CONTROL DEVICE FOR TRANSMISSION

BACKGROUND OF THE INVENTION

1. Field of the Invention

The invention relates to a lubrication control device for a transmission.

2. Description of Related Art

As an example of a device for adjusting the temperature of oil for a transmission, Japanese Patent Application Publication No. 2002-266993 (JP 2002-266993 A) discloses a hydraulic oil cooling device for an automatic transmission for a vehicle. The hydraulic oil cooling device is provided with a water-cooled oil cooler and an air-cooled oil cooler which are connected in series to each other and cools hydraulic oil that circulates through an oil pump for the automatic transmission for a vehicle, an oil pressure control circuit, and a lubrication circuit of a transmission mechanism. A cooler bypass valve and a bypass valve are disposed in the hydraulic oil cooling device for an automatic transmission for a vehicle. The cooler bypass valve allows the hydraulic oil to bypass the water-cooled oil cooler and the air-cooled oil cooler and circulate through the oil pump, the oil pressure control circuit, and the lubrication circuit only in a case where the temperature of the hydraulic oil does not exceed a predetermined value and a hydraulic oil line pressure generated in the oil pump is not exceeded by a predetermined value. The bypass valve allows the hydraulic oil to bypass only the air-cooled oil cooler and circulate through the oil pump, the oil pressure control circuit, and the lubrication circuit in a case where the detected temperature of the hydraulic oil does not reach a required value.

According to JP 2002-266993 A, the hydraulic oil is warmed by engine coolant in the water-cooled oil cooler in a case where the hydraulic oil temperature is low. In this case, a rise in the temperature of the hydraulic oil is promoted. The hydraulic oil cooling device for an automatic transmission for a vehicle according to JP 2002-266993 A is configured to allow an oil passage passing through the oil cooler and an oil passage bypassing the oil cooler to be merged with each other on the further upstream side than the lubrication circuit.

SUMMARY OF THE INVENTION

The configuration of JP 2002-266993 A includes ON/OFF control regarding whether or not to allow the flow of the hydraulic oil to the oil cooler. Accordingly, in the ON state, the flow rate at which the hydraulic oil flows to the oil cooler may be excessively high, the rise in the temperature of the hydraulic oil in the oil cooler may become slight, and the warm-up of the transmission may be delayed. Since the hydraulic oil passing through the oil cooler and the hydraulic oil bypassing the oil cooler are merged with each other and then flow to the lubrication circuit in this configuration, the temperature of the hydraulic oil supplied to the lubricated portion is unlikely to increase. Accordingly, the loss in the transmission may not be sufficiently reduced and further improvement is desired for transmission loss reduction.

The invention provides a lubrication control device for a transmission that is capable of appropriately reducing a transmission loss.

According to an aspect of the invention, there is provided a lubrication control device for a transmission including an oil pump, a heat exchanger, an oil quantity control valve, a first bypass oil passage, and an electronic control unit. The oil pump is configured to send out oil to the transmission. The heat exchanger is connected between the oil pump and a lubricated portion of the transmission. The heat exchanger is configured to perform heat exchange between the oil and a liquid-phase medium circulating in an engine. The oil quantity control valve includes an inflow port, a supply port, and a discharge port. The inflow port is configured to allow the oil sent out from the oil pump to flow into the inflow port. The supply port is connected to the heat exchanger. The oil quantity control valve is configured to control a supply oil quantity as a flow rate of the oil flowing from the inflow port to the supply port and discharge a residue of the oil from the discharge port. The first bypass oil passage is connected to the discharge port. The first bypass oil passage is configured to allow the flow of the oil bypassing the lubricated portion. The electronic control unit is configured to adjust an opening degree of the oil quantity control valve such that the supply oil quantity increases as a temperature of the oil increases.

In the aspect described above, the electronic control unit may be configured to adjust the opening degree of the oil quantity control valve to a required opening degree based on the temperature of the oil. The required opening degree may be an opening degree of the oil quantity control valve reflecting a minimum flow rate of the oil required for the lubrication of the lubricated portion. The electronic control unit may be configured to adjust the opening degree of the oil quantity control valve into a lower limit opening degree in a case where the lower limit opening degree exceeds the required opening degree. The lower limit opening degree may be an opening degree of the oil quantity control valve reflecting a lower limit flow rate of the oil for performing the heat exchange in the heat exchanger.

In the aspect described above, the electronic control unit may be configured to change the opening degree of the oil quantity control valve in accordance with the temperature of the oil in a case where the temperature of the oil is higher than a low temperature side boundary temperature. The electronic control unit may be configured to maintain the opening degree of the oil quantity control valve at a constant opening degree in a case where the temperature of the oil is equal to or lower than the low temperature side boundary temperature. The low temperature side boundary temperature may be the lowest oil temperature assumed in a case where a vehicle is used in a general environment.

In the aspect described above, the electronic control unit may be configured to control the opening degree of the oil quantity control valve such that the supply oil quantity increases as a throttle opening degree increases. In the aspect described above, a second bypass oil passage and a bypass valve may be further provided. The second bypass oil passage may be configured to connect the oil quantity control valve side of the heat exchanger and the lubricated portion side of the heat exchanger to each other. The bypass valve may be configured to control the flow of the oil in the second bypass oil passage. The electronic control unit may be configured to control the bypass valve such that the bypass valve is closed in a case where the temperature of the oil is lower than a predetermined value and the bypass valve is opened in a case where the temperature of the oil is equal to or higher than the predetermined value.

According to the lubrication control device for a transmission of the aspect described above, the electronic control unit controls the opening degree of the oil quantity control valve so that the supply oil quantity increases as the temperature of the oil increases. This control reduces the flow rate of the oil flowing into the heat exchanger in a case where the temperature of the oil is low and increases the amount of rise in the temperature of the oil attributable to the heat exchange. The surplus oil flows from the discharge port of the oil quantity control valve via the bypass oil passage, bypassing the lubricated portion. In other words, the oil warmed by the heat exchanger is supplied to the lubricated portion without being mixed with the surplus oil. Accordingly, it is possible to supply only a required amount of the warmed oil to the lubricated portion, and stirring loss and dragging loss can be reduced. Accordingly, the loss in the transmission is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a lubrication control device according to embodiments of the invention will be described in detail with reference to accompanying drawings. The invention is not limited to the embodiments. Elements constituting the following embodiments include those that can be easily assumed by those skilled in the art or those practically identical thereto.

First Embodiment

Figure 1:
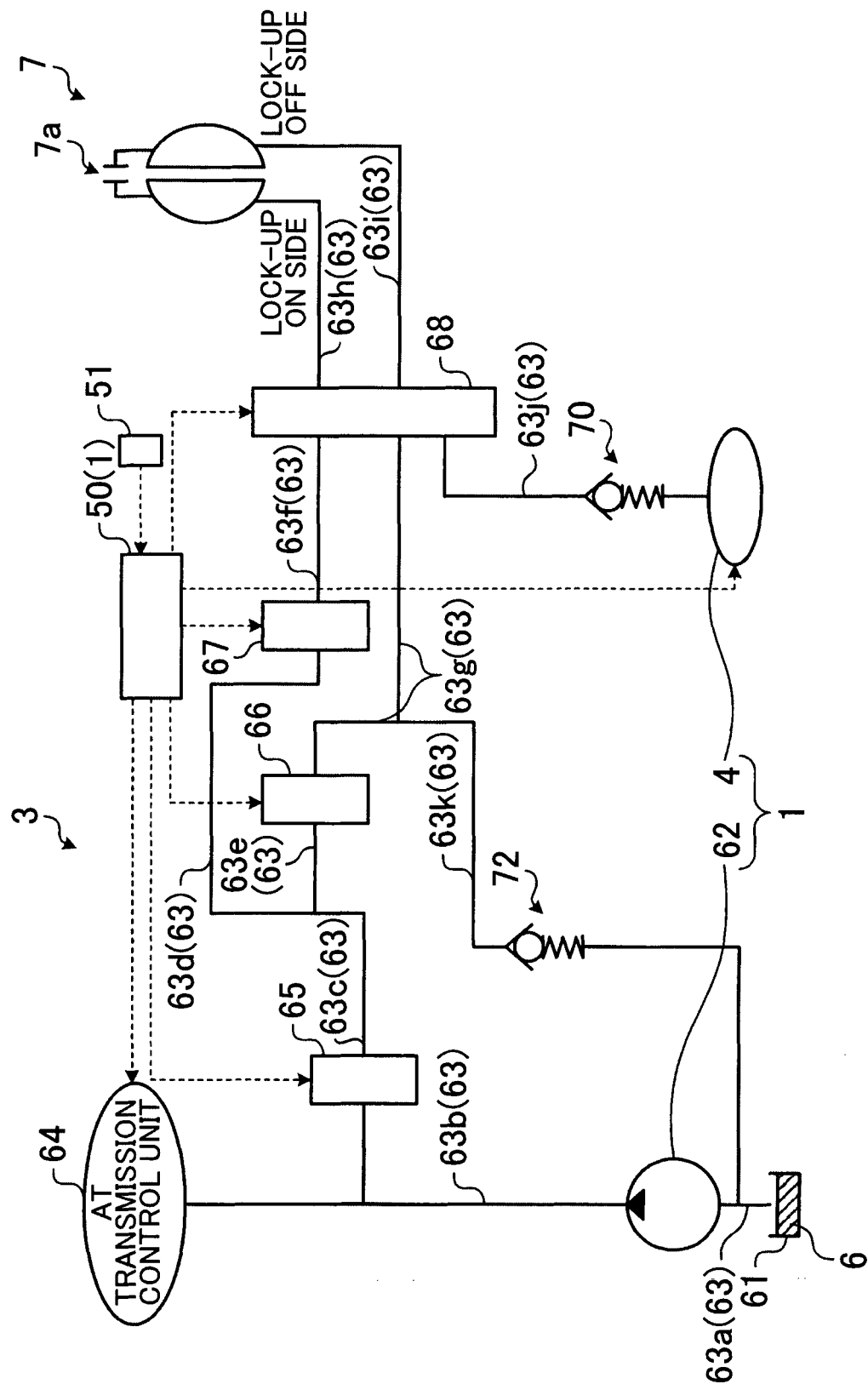
FIG. 1 is a diagram illustrating a transmission according to a first embodiment.
Figure 2:
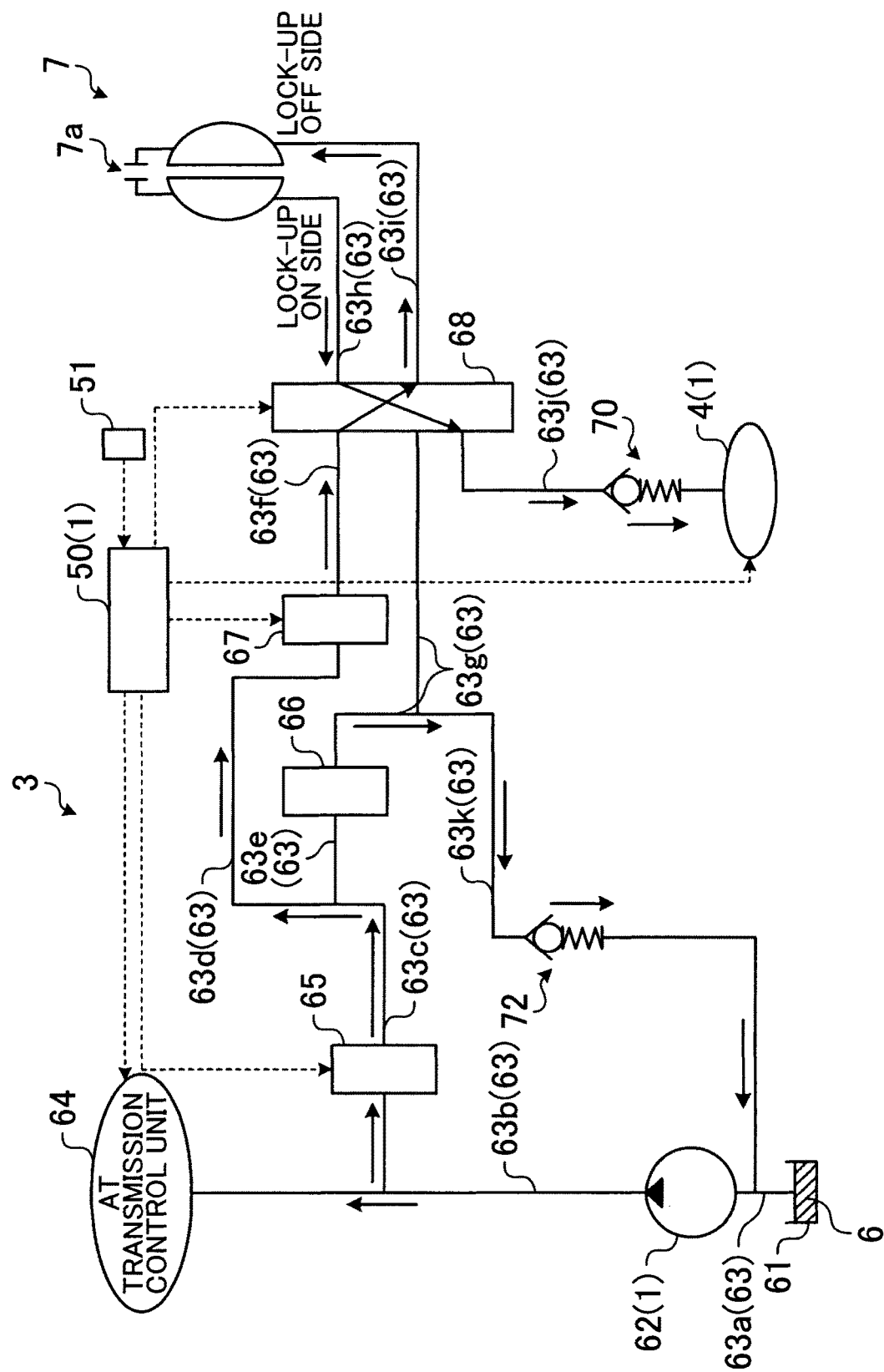
FIG. 2 is a diagram illustrating the flow of oil in a lock-up clutch released state according to the first embodiment.
Figure 3:
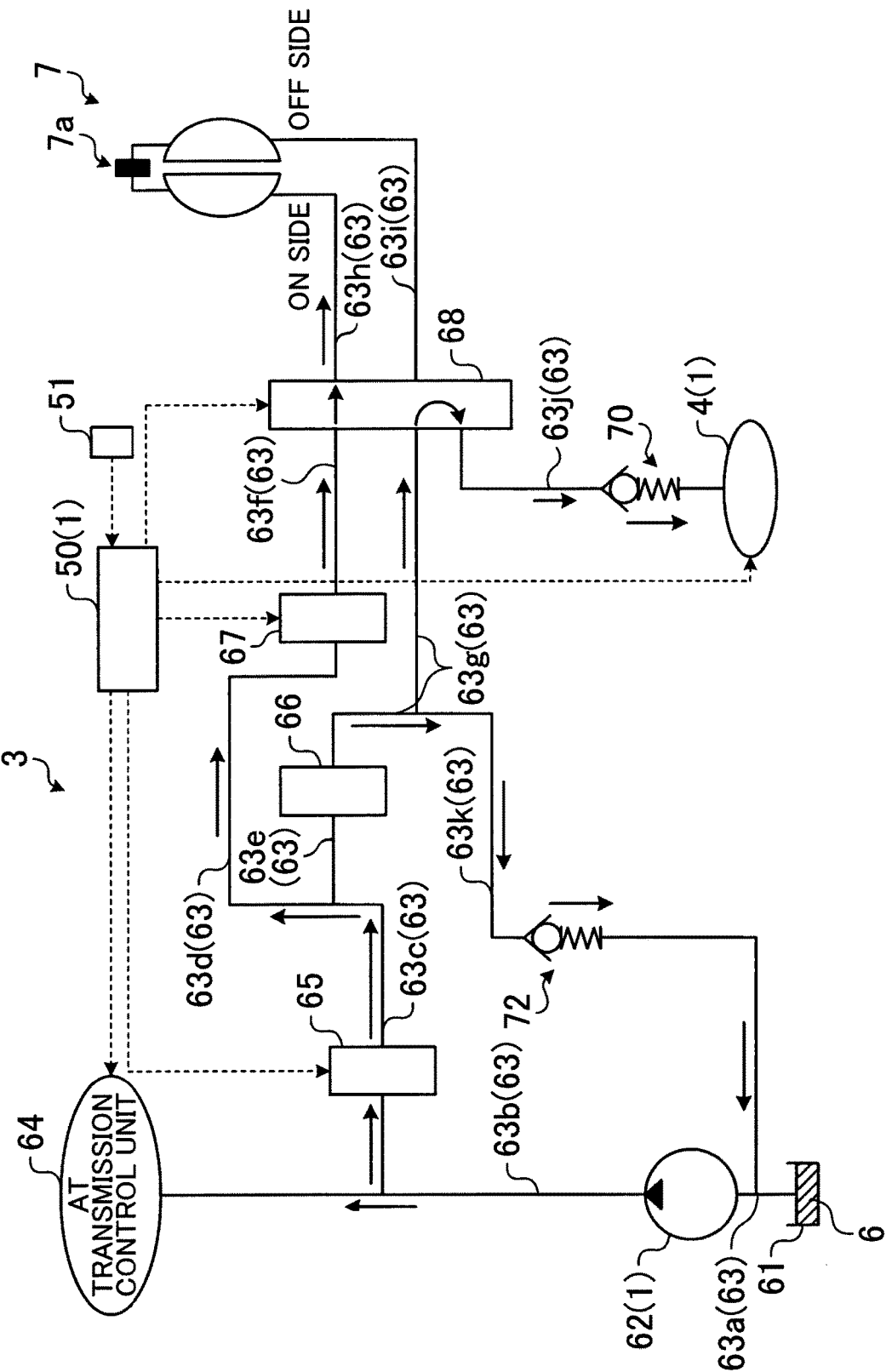
FIG. 3 is a diagram illustrating the flow of oil in a lock-up clutch engagement state according to the first embodiment.
Figure 4:
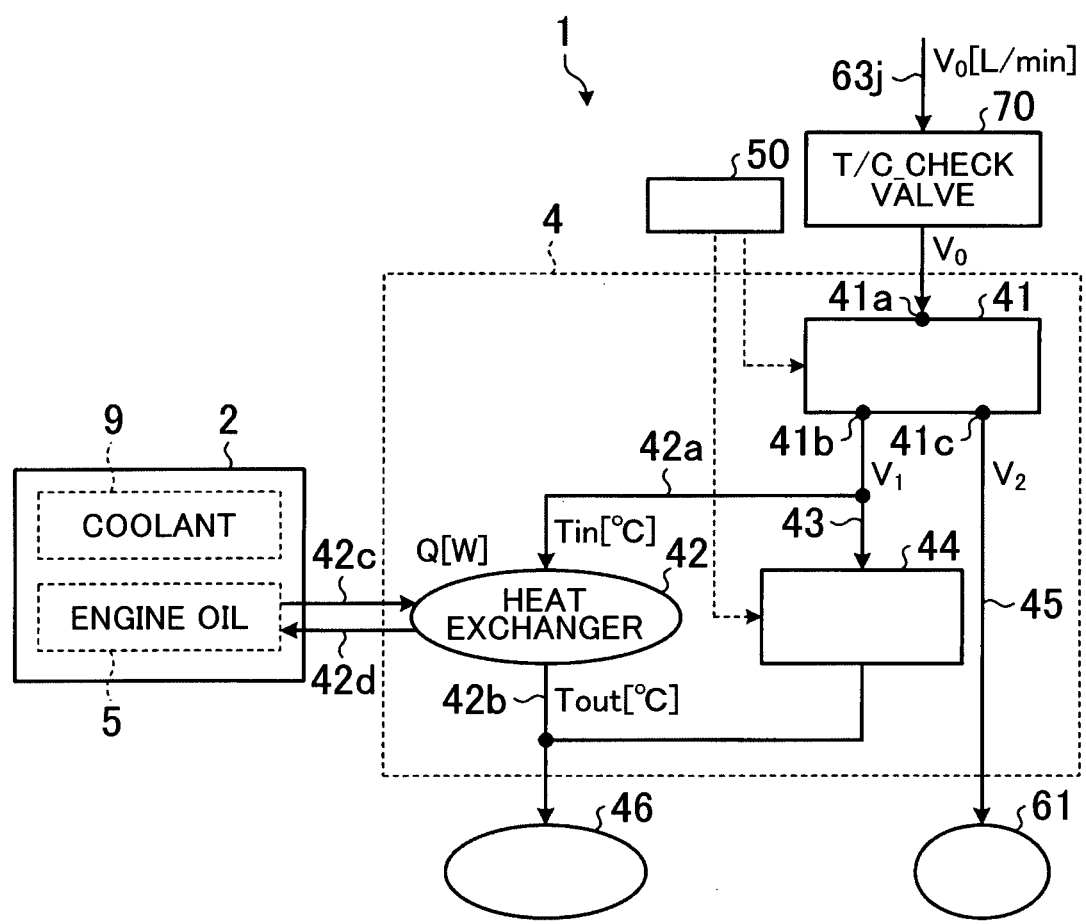
FIG. 4 is a schematic configuration diagram of a lubrication control device according to the first embodiment.
Figure 5:
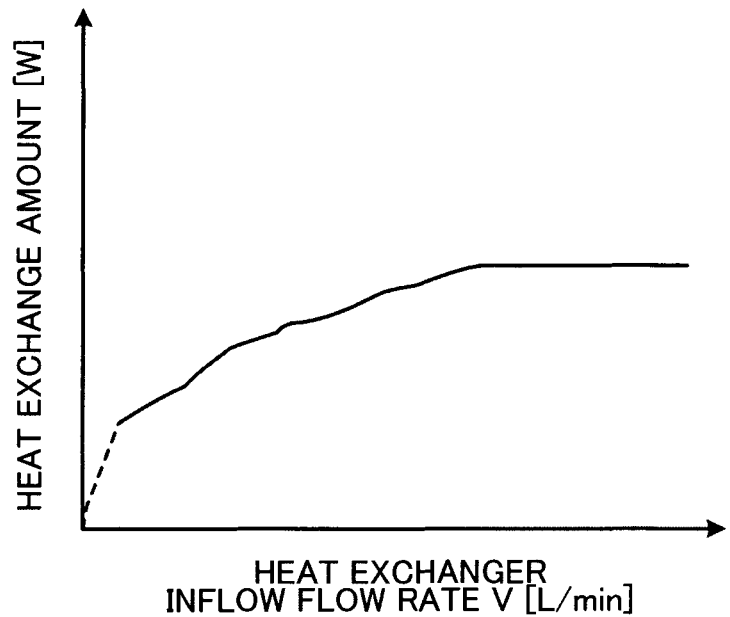
FIG. 5 is a diagram illustrating a heat exchange amount of a heat exchanger.
Figure 6:
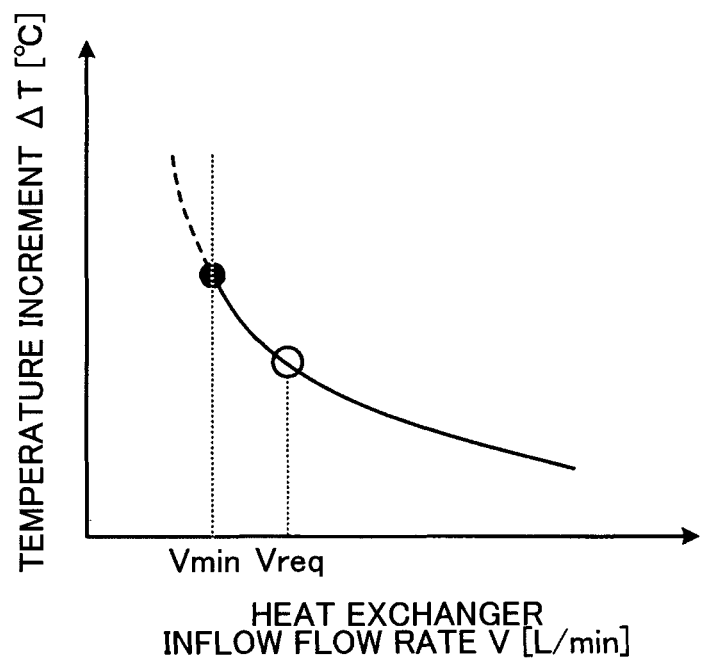
FIG. 6 is a diagram illustrating a temperature increment in the heat exchanger.
Figure 7:
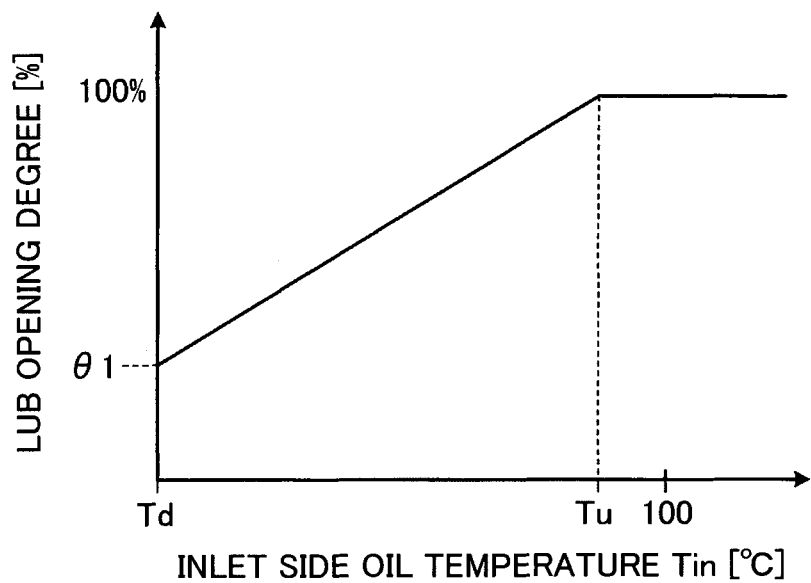
FIG. 7 is a diagram illustrating a relationship between a T/M oil temperature and the opening degree of an oil quantity control valve.
Figure 8:
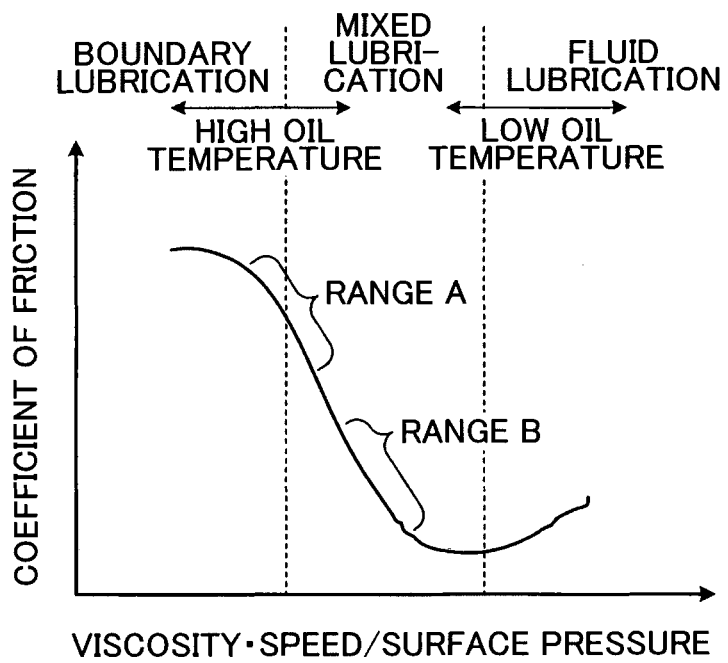
FIG. 8 is an explanatory drawing of a lubrication state.
Figure 9:
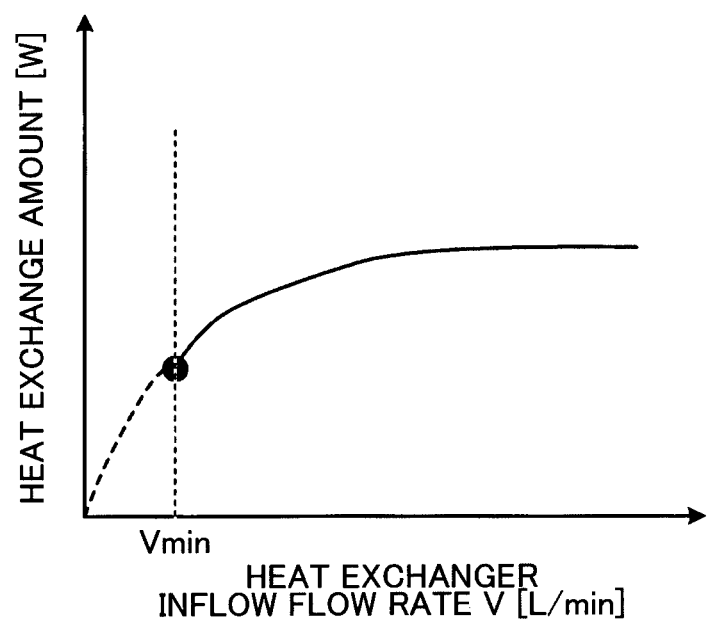
FIG. 9 is an explanatory drawing of a lower limit flow rate according to the first embodiment.
Figure 10:
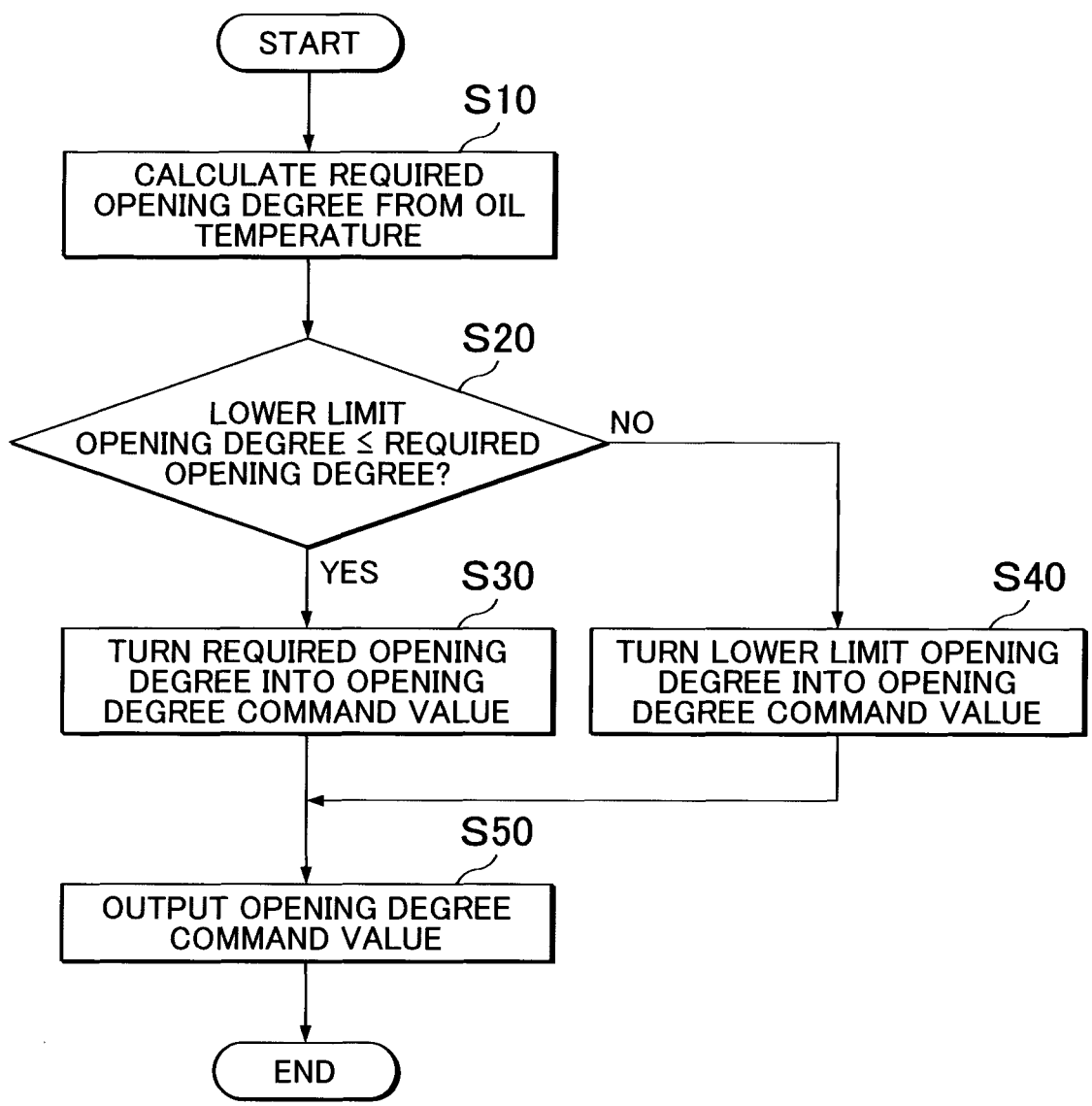
FIG. 10 is a flowchart illustrating the operation of the lubrication control device according to the first embodiment.

A first embodiment will be described with reference to FIGS. 1 to 10. This embodiment relates to the lubrication control device. FIG. 1 is a diagram illustrating a transmission according to the first embodiment of the invention. FIG. 2 is a diagram illustrating the flow of oil in a lock-up clutch released state according to the first embodiment. FIG. 3 is a diagram illustrating the flow of oil in a lock-up clutch engagement state according to the first embodiment. FIG. 4 is a schematic configuration diagram of the lubrication control device according to the first embodiment. FIG. 5 is a diagram illustrating a heat exchange amount of a heat exchanger. FIG. 6 is a diagram illustrating a temperature increment in the heat exchanger. FIG. 7 is a diagram illustrating a relationship between a T/M oil temperature and the opening degree of an oil quantity control valve. FIG. 8 is an explanatory drawing of a lubrication state. FIG. 9 is an explanatory drawing of a lower limit flow rate according to the first embodiment. FIG. 10 is a flowchart illustrating the operation of the lubrication control device according to the first embodiment.

The transmission 3 according to this embodiment that is illustrated in FIG. 1 is a stepped automatic transmission. The transmission 3 according to this embodiment is mounted on a vehicle that has an engine 2 (refer to FIG. 4) as a power source. The transmission 3 has a clutch and a brake as engagement devices. The transmission 3 transmits the rotation of the engine 2 at a transmission gear ratio reflecting a combination of the engagement devices in an engagement state. As illustrated in FIG. 1, the transmission 3 is configured to include the lubrication control device 1, a transmission oil passage 63, an AT transmission electronic control unit 64, a torque converter 7, and an oil pan 61. The lubrication control device 1 is configured to include an oil pump 62, a lubrication circuit 4, and an electronic control unit 50.

Transmission oil 6 is stored in the oil pan 61 of the transmission 3. The transmission oil 6, which is oil for the transmission 3, circulates through respective portions of the transmission 3. The oil pump 62 suctions, pressurizes, and sends out the transmission oil 6 stored in the oil pan 61. The transmission oil 6 sent out by the oil pump 62 returns to the oil pan 61 after circulating in the transmission 3.

The transmission oil passage 63 has an intake oil passage 63a, a discharge oil passage 63b, a first oil passage 63c, a second oil passage 63d, a third oil passage 63e, a fourth oil passage 63f, a fifth oil passage 63g, an engagement side supply oil passage 63h, a release side supply oil passage 63i, a lubrication system oil passage 63j, and a return oil passage 63k.

The intake oil passage 63a connects the oil pan 61 and an intake port of the oil pump 62 to each other. The discharge oil passage 63b is connected to a discharge port of the oil pump 62. The discharge oil passage 63b is connected to the AT transmission electronic control unit 64. The AT transmission electronic control unit 64 controls the oil pressure that is supplied to each of the engagement devices of the transmission 3. A primary regulator valve 65 adjusts the oil pressure of the discharge oil passage 63b to a predetermined line pressure. The primary regulator valve 65 is connected to each of the discharge oil passage 63b and the first oil passage 63c. The surplus transmission oil 6 resulting from the pressure adjustment is discharged from the primary regulator valve 65 to the first oil passage 63c.

The second oil passage 63d and the third oil passage 63e are connected to the end portion of the first oil passage 63c on the side opposite to the primary regulator valve 65 side. A secondary regulator valve 66 is arranged in the third oil passage 63e. The secondary regulator valve 66 adjusts the oil pressures of the first oil passage 63c, the second oil passage 63d, and the third oil passage 63e to a predetermined target pressure that is equal to or lower than the line pressure. The surplus transmission oil 6 resulting from the pressure adjustment is discharged from the secondary regulator valve 66 to the fifth oil passage 63g. A lock-up control valve 67 is arranged on the downstream side of the second oil passage 63d. The lock-up control valve 67, which is connected to the second oil passage 63d and the fourth oil passage 63f, controls the oil pressure that is supplied to the fourth oil passage 63f. The lock-up control valve 67 adjusts the pressure of the second oil passage 63d to an oil pressure that is required for a lock-up clutch 7a and supplies the adjusted pressure to the fourth oil passage 63f.

A lock-up relay valve 68 controls the release-engagement switching of the lock-up clutch 7a of the torque converter 7. The lock-up relay valve 68 is connected to each of the fourth oil passage 63f, the fifth oil passage 63g, the engagement side supply oil passage 63h, the release side supply oil passage 63i, and the lubrication system oil passage 63j. The engagement side supply oil passage 63h and the release side supply oil passage 63i are supply oil passages directed toward the torque converter 7. The engagement side supply oil passage 63h is connected to an engagement hydraulic chamber that generates an oil pressure which causes the lock-up clutch 7a to be engaged. The oil pressure that is supplied to the engagement hydraulic chamber of the torque converter 7 via the engagement side supply oil passage 63h generates a pressing force causing a friction engagement element on an input side of the lock-up clutch 7a and a friction engagement element on an output side of the lock-up clutch 7a to be engaged with each other. For example, the oil pressure that is supplied to the torque converter 7 via the engagement side supply oil passage 63h presses a lock-up piston in an engagement direction and causes the lock-up clutch 7a to be engaged.

The release side supply oil passage 63i is connected to a release hydraulic chamber that generates an oil pressure which causes the lock-up clutch 7a to be released. The oil pressure that is supplied to the release hydraulic chamber of the torque converter 7 via the release side supply oil passage 63i generates a pressing force causing the friction engagement element on the input side of the lock-up clutch 7a and the friction engagement element on the output side of the lock-up clutch 7a to be separated from each other. For example, the oil pressure that is supplied to the torque converter 7 via the release side supply oil passage 63i presses the lock-up piston in a release direction and causes the lock-up clutch 7a to be released.

The lubrication system oil passage 63j is connected to the lubrication circuit 4 via a torque converter check valve 70. The torque converter check valve 70 allows the flow of the transmission oil 6 from the torque converter 7 side to the lubrication circuit 4 side and regulates the flow of the transmission oil 6 from the lubrication circuit 4 side to the torque converter 7 side. The torque converter check valve 70 is opened in a case where the oil pressure on the torque converter 7 side is higher by at least a predetermined pressure than the oil pressure on the lubrication circuit 4 side.

The return oil passage 63k is connected to the fifth oil passage 63g. The return oil passage 63k connects the fifth oil passage 63g and the intake oil passage 63a to each other. The return oil passage 63k is an oil passage that supplies the surplus portion of the transmission oil 6 pumped via the transmission oil passage 63 by the oil pump 62 to the intake oil passage 63a. A check valve 72 is arranged in the return oil passage 63k. The check valve 72 adjusts the oil pressure of the fifth oil passage 63g so that the transmission oil 6 flows to the lubrication circuit 4. For example, the valve opening pressure of the check valve 72 is higher than the valve opening pressure of the torque converter check valve 70.

The electronic control unit 50 controls the transmission 3. The electronic control unit 50 controls the primary regulator valve 65, the secondary regulator valve 66, the lock-up control valve 67, and the lock-up relay valve 68. In addition, the electronic control unit 50 controls the gear shift of the transmission 3 with the AT transmission electronic control unit 64. An oil temperature sensor 51 is connected to the electronic control unit 50. The oil temperature sensor 51 detects the temperature of the transmission oil 6. For example, the oil temperature sensor 51 detects the oil temperature of the transmission oil 6 in the discharge oil passage 63b. In the following description, the temperature of the transmission oil 6 will be also referred to as the "T/M oil temperature". The electronic control unit 50 has the function of controlling the operation of the lubrication control device 1.

The flow of the transmission oil 6 in the released state of the lock-up clutch 7a will be described with reference to FIG. 2. In a case where the lock-up clutch 7a is to be released, the electronic control unit 50 performs a lock-up release command on the lock-up relay valve 68. The lock-up relay valve 68 allows the fourth oil passage 63f and the release side supply oil passage 63i to communicate with each other and allows the engagement side supply oil passage 63h and the lubrication system oil passage 63j to communicate with each other based on the lock-up release command as illustrated in FIG. 2. Then, the transmission oil 6 that is pressure-adjusted by the lock-up control valve 67 flows into the torque converter 7 via the lock-up relay valve 68 and the release side supply oil passage 63i as illustrated in FIG. 2. As a result, the lock-up clutch 7a is released. The transmission oil 6 in the torque converter 7 flows out to the lubrication system oil passage 63j from the engagement side supply oil passage 63h via the lock-up relay valve 68.

In a case where the T/M oil temperature is lower than a temperature at which lock-up is allowed, the electronic control unit 50 prohibits the engagement of the lock-up clutch 7a and allows the lock-up clutch 7a to be in the released state. For example, the electronic control unit 50 determines whether to prohibit or allow the engagement of the lock-up clutch 7a based on the result of a comparison between the temperature detected by the oil temperature sensor 51 and the temperature at which lock-up is allowed.

The flow of the transmission oil 6 in the engagement state of the lock-up clutch 7a will be described with reference to FIG. 3. The electronic control unit 50 allows the engagement of the lock-up clutch 7a when the T/M oil temperature is equal to or higher than the temperature at which lock-up is allowed. In a case where the lock-up clutch 7a is to be engaged, the electronic control unit 50 performs a lock-up engagement command on the lock-up relay valve 68. The lock-up relay valve 68 allows the fourth oil passage 63f and the engagement side supply oil passage 63h to communicate with each other and allows the fifth oil passage 63g and the lubrication system oil passage 63j to communicate with each other based on the lock-up engagement command. Then, the transmission oil 6 that is pressure-adjusted by the lock-up control valve 67 flows into the torque converter 7 via the lock-up relay valve 68 and the engagement side supply oil passage 63h and the lock-up clutch 7a is engaged as illustrated in FIG. 3.

The lubrication oil passage 4 will be described with reference to FIG. 4. As illustrated in FIG. 4, the lubrication circuit 4 is configured to include an oil quantity control valve 41, a heat exchanger 42, a second bypass oil passage 43, a bypass valve 44, and a first bypass oil passage 45. The heat exchanger 42 is connected between the oil pump 62 (refer to FIG. 1) and a lubricated portion 46 of the transmission 3 and performs heat exchange between a liquid-phase medium circulating in the engine 2 and the transmission oil 6. In other words, the heat exchanger 42 is disposed in the middle of an oil passage circuit that guides the transmission oil 6 sent out by the oil pump 62 to the lubricated portion 46. The heat exchanger 42 is interposed between the oil pump 62 and the lubricated portion 46 in the flow path of the transmission oil 6.

The lubricated portion 46 is, for example, a meshing portion of gears of the transmission 3. Specifically, the lubricated portion 46 is a meshing portion of gears of a planetary gear mechanism and a meshing portion of differential gears. The heat exchanger 42 according to this embodiment is arranged between the oil quantity control valve 41 and the lubricated portion 46. The engine 2 has engine oil 5 and coolant 9 as liquid-phase media circulating in the engine 2. The engine oil 5 is sent out by an engine oil pump and circulates in the engine 2. The engine oil 5 lubricates and cools each portion of the engine 2. The coolant 9 is sent out by a water pump and circulates in the engine 2. In addition, the coolant 9 is cooled by a radiator when the water temperature of the coolant 9 is equal to or higher than a certain temperature. The heat exchanger 42 according to this embodiment performs heat exchange between the engine oil 5 and the transmission oil 6.

The oil quantity control valve 41 has an inflow port 41a, a supply port 41b, and a discharge port 41c. The oil quantity control valve 41 controls the flow rate of the transmission oil 6 flowing from the inflow port 41a to the supply port 41b and discharges the residue of the transmission oil 6 from the discharge port 41c. The inflow port 41a is connected to the oil pump 62 via the torque converter check valve 70. The transmission oil 6 that is sent out by the oil pump 62 and passes through the torque converter check valve 70 from the lubrication system oil passage 63j flows into the oil quantity control valve 41 from the inflow port 41a. The supply port 41b is connected to the heat exchanger 42 via a first inlet oil passage 42a.

The oil quantity control valve 41 has a valve that allows the inflow port 41a and the supply port 41b to communicate with or be blocked from each other and an actuator that adjusts the opening degree of the valve. The oil quantity control valve 41 adjusts the opening degree θ [%] of the valve to any opening degree with the actuator. When the value of the opening degree θ of the valve increases, the flow path cross-sectional area between the inflow port 41a and the supply port 41b increases and the flow rate of the transmission oil 6 flowing from the inflow port 41a to the supply port 41b increases. The residue of the transmission oil 6 flowing into the inflow port 41a of the oil quantity control valve 41 from the torque converter check valve 70, that is, the portion other than that flowing to the supply port 41b, is discharged from the discharge port 41c.

The first bypass oil passage 45 is connected to the discharge port 41c. The first bypass oil passage 45 connects the discharge port 41c and the oil pan 61 to each other. The first bypass oil passage 45 is an oil passage that allows the flow of the transmission oil 6 bypassing the heat exchanger 42 and the lubricated portion 46.

Each of the first inlet oil passage 42a, a first outlet oil passage 42b, a second inlet oil passage 42c, and a second outlet oil passage 42d is connected to the heat exchanger 42. The transmission oil 6 flows into the heat exchanger 42 via the first inlet oil passage 42a and flows out from the heat exchanger 42 via the first outlet oil passage 42b. The engine oil 5 flows into the heat exchanger 42 via the second inlet oil passage 42c and flows out from the heat exchanger 42 via the second outlet oil passage 42d.

The second bypass oil passage 43 is an oil passage that connects the oil quantity control valve 41 side rather than the heat exchanger 42 and the lubricated portion 46 side rather than the heat exchanger 42 to each other. In other words, the second bypass oil passage 43 is an oil passage that connects the further upstream side than the heat exchanger 42 and the further downstream side than the heat exchanger 42 in the flow direction of the transmission oil 6 to each other and allows the flow of the transmission oil 6 bypassing the heat exchanger 42. The second bypass oil passage 43 according to this embodiment connects the first inlet oil passage 42a and the first outlet oil passage 42b to each other.

The bypass valve 44 is arranged in the second bypass oil passage 43. The bypass valve 44 controls the flow of the transmission oil 6 from the supply port 41b to the second bypass oil passage 43. The bypass valve 44 according to this embodiment is an on-off valve that blocks or releases the second bypass oil passage 43. In a case where the bypass valve 44 is closed, the flow of the transmission oil 6 from the supply port 41b to the second bypass oil passage 43 is prohibited. Accordingly, the bypass valve 44 in the closed state causes the transmission oil 6 flowing out from the supply port 41b to flow to the heat exchanger 42 in its entirety. In a case where the bypass valve 44 is open, the flow of the transmission oil 6 from the supply port 41b to the second bypass oil passage 43 is allowed. Accordingly, the bypass valve 44 in the open state allows the flow of the transmission oil 6 bypassing the heat exchanger 42 from the supply port 41b toward the lubricated portion 46.

The electronic control unit 50 controls the oil quantity control valve 41 and the bypass valve 44. The electronic control unit 50 according to this embodiment changes the opening degree θ [%] of the oil quantity control valve 41 and the open and closed state of the bypass valve 44 in accordance with the temperature of the transmission oil 6 (T/M oil temperature). In a case where the T/M oil temperature is lower than a predetermined temperature, the electronic control unit 50 allows the bypass valve 44 to be in the closed state. The predetermined temperature is, for example, the warm-up completion temperature of the transmission 3. When the bypass valve 44 is in the closed state, the transmission oil 6 flows from the supply port 41b to the lubricated portion 46 through the heat exchanger 42. In the heat exchanger 42, heat exchange is carried out between the transmission oil 6 and the engine oil 5. During the warm-up of the engine 2 and the transmission 3, the oil temperature of the engine oil 5 is relatively higher than the T/M oil temperature. Accordingly, heat is transferred from the engine oil 5 to the transmission oil 6 in the heat exchanger 42 and the T/M oil temperature rises. While the T/M oil temperature is lower than the predetermined temperature, the bypass valve 44 is closed, and thus the warm-up of the transmission 3 is promoted by the rise in the oil temperature of the transmission oil 6. It is desirable that the electronic control unit 50 maintains the bypass valve 44 in the closed state in a temperature range of the T/M oil temperature where the opening degree θ [%] of the oil quantity control valve 41 is variably controlled.

In a case where the oil temperature of the transmission oil 6 is equal to or higher than a predetermined temperature, the electronic control unit 50 allows the bypass valve 44 to be in the open state. When the bypass valve 44 is in the open state, the transmission oil 6 flows from the supply port 41$b$ to the lubricated portion 46 through the second bypass oil passage 43.

In an oil passage configuration according to the related art, oil supplied from an oil pressure control system for gear shift to a lubrication system passes through a heat exchanger in its entirety in a case where heat exchange is performed in a transmission that has the heat exchanger in the lubrication system. The hydraulic oil cooling device according to JP 2002-266993 A, for example, has a configuration in which hydraulic oil flowing from a control valve toward a lubrication circuit flows in its entirety to any one of a water-cooled oil cooler and a cooler bypass valve.

As illustrated in FIG. 5, the heat exchange amount in the heat exchanger increases as a result of an increase in the flow rate of the oil flowing into the heat exchanger. In FIG. 5, the horizontal axis represents the flow rate V [L/min] of the oil flowing into the heat exchanger and the vertical axis represents the heat exchange amount [W] in the heat exchanger. An outlet side oil temperature Tout [° C.], which is the temperature of the transmission oil 6 flowing out from the heat exchanger 42, is calculated based on, for example, the following [Equation 1]. Herein, the inlet side oil temperature Tin [° C.] on the right-hand side is the temperature of the transmission oil 6 flowing into the heat exchanger 42. In addition, the heat exchanger inflow flow rate V [L/min] is the flow rate of the transmission oil 6 flowing into the heat exchanger 42. The heat exchange amount Q(V) [W] is a heat exchange amount reflecting the heat exchanger inflow flow rate V. A density ρ is the density of the transmission oil 6 and the specific heat c is the specific heat of the transmission oil 6.

$$T_{out} = T_{in} + \frac{1}{V} \frac{Q(V)}{\rho \cdot c} \qquad \text{[Equation 1]}$$

In a case where heat exchange is performed between the engine oil having a relatively higher temperature and the transmission oil having a relatively lower temperature in the heat exchanger 42, the amount of heat transferred from the engine oil to the transmission oil increases as the flow rate of the transmission oil increases. In the ON/OFF control regarding whether or not to allow the oil flowing into the lubrication system to flow in its entirety to the heat exchanger as in the related art, it is considered to be advantageous to allow the oil to continue to flow in its entirety to the heat exchanger because this promotes the warm-up of the transmission.

In a case where the temperature of the transmission oil 6 flowing out from the heat exchanger 42 is taken into account, however, a high flow rate of the transmission oil 6 is not always advantageous. As illustrated in FIG. 6, a decreased flow rate of the transmission oil 6 flowing into the heat exchanger 42 is advantageous in increasing the outlet side oil temperature Tout. In FIG. 6, the horizontal axis represents the flow rate of the transmission oil 6 flowing into the heat exchanger 42 and the vertical axis represents a temperature increment ΔT [° C.]. The temperature increment ΔT corresponds to the difference (Tout−Tin) between the outlet side oil temperature Tout and the inlet side oil temperature Tin.

As illustrated in FIG. 6, the temperature increment ΔT in the transmission oil 6 that results from the heat exchange carried out by the heat exchanger 42 increases as the flow rate of the transmission oil 6 flowing into the heat exchanger 42 decreases. In the lubrication control device 1 according to this embodiment, the oil quantity control valve 41 adjusts the flow rate of the transmission oil 6 supplied to the heat exchanger 42 and the lubricated portion 46 side (supply oil quantity V1 to be described later). The electronic control unit 50 controls the opening degree θ of the oil quantity control valve 41 so that the supply oil quantity V1 pertaining to a case where the T/M oil temperature is low is equal to or lower than the supply oil quantity V1 pertaining to a case where the T/M oil temperature is high. The electronic control unit 50 according to this embodiment controls the opening degree of the oil quantity control valve 41 based on a detected value or an estimated value of the inlet side oil temperature Tin.

The electronic control unit 50 decreases the flow rate of the transmission oil 6 flowing to the heat exchanger 42 side by controlling the opening degree θ of the oil quantity control valve 41 to be lower in a case where the inlet side oil temperature Tin is low than in a case where the inlet side oil temperature Tin is high. In this specification, the opening degree θ of the oil quantity control valve 41 is also referred to as an LUB opening degree. FIG. 7 illustrates a map showing a correspondence relationship between the inlet side oil temperature Tin [° C.] and the LUB opening degree according to this embodiment. In FIG. 7, the horizontal axis represents the inlet side oil temperature Tin and the vertical axis represents the LUB opening degree [%]. In this embodiment, the oil quantity control valve 41 is controlled so that the LUB opening degree increases as the inlet side oil temperature Tin increases in the temperature range between a low temperature side boundary temperature Td and a high temperature side boundary temperature Tu. In other words, the electronic control unit 50 changes the opening degree of the oil quantity control valve 41 in accordance with the inlet side oil temperature Tin in a case where the inlet side oil temperature Tin is higher than the low temperature side boundary temperature Td and is lower than the high temperature side boundary temperature Tu. The electronic control unit 50 according to this embodiment linearly changes the LUB opening degree in accordance with a change in the inlet side oil temperature Tin in a case where the inlet side oil temperature Tin is in the temperature range between the low temperature side boundary temperature Td and the high temperature side boundary temperature Tu. Examples of the low temperature side boundary temperature Td, which is the lowest oil temperature assumed in a case where the vehicle is used in a general environment, may include 25 [° C.], 0 [° C.], and a temperature close thereto (for example, ±5° C.). Examples of the high temperature side boundary temperature Tu, which is the highest oil temperature assumed in a case where the vehicle is used in a general environment, may include 80 [° C.], 100 [° C.], and a temperature close thereto (for example, ±5° C.). As illustrated in FIG. 7, the electronic control unit 50 maintains the opening degree θ of the oil quantity control valve 41 at a constant opening degree θ1 in a case where the temperature of the transmission oil 6 is equal to or lower than the low temperature side boundary temperature Td. It is preferable that the opening degree θ1 is an opening degree equal to or higher than that of full closing (opening degree of 0%) and lower than that of full opening (opening degree of 100%). For example, the opening degree θ1 may be a lower limit opening degree θmin for performing heat exchange in the heat exchanger 42. In this case, the heat exchange can be appropriately performed in the heat exchanger 42. In addition, the opening degree θ1 may be, for example, an opening degree reflecting the minimum flow rate of the transmission oil 6 required for the lubrication of the lubricated portion 46. In a case where the temperature of the transmission oil 6 is equal to or lower than the low temperature side boundary temperature Td, for example, the minimum flow rate of the transmission oil 6 required for the lubrication of the lubricated portion 46 is constant regardless of the temperature. In this case, the opening degree θ1 may be set as the opening degree reflecting the minimum flow rate required for the lubrication.

The loss in the transmission 3 is reduced as described below by the lubrication control device 1 according to this embodiment. In this specification, the flow rate of the transmission oil 6 flowing into the oil quantity control valve 41 is referred to as an inflow oil quantity V0 [L/min], the flow rate of the transmission oil 6 flowing from the inflow port 41a to the supply port 41b is referred to as a supply oil quantity V1 [L/min], and the flow rate of the transmission oil 6 flowing from the inflow port 41a to the discharge port 41c is referred to as a discharge oil quantity V2 [L/min]. The supply oil quantity V1 is the flow rate of the transmission oil 6 supplied to the heat exchanger 42 side by the oil quantity control valve 41. The discharge oil quantity V2, which is part of the inflow oil quantity V0, is the flow rate of the residue of the transmission oil 6 that is not supplied to the heat exchanger 42 side by the oil quantity control valve 41. In other words, the total of the supply oil quantity V1 and the discharge oil quantity V2 corresponds to the inflow oil quantity V0.

In a case where the inlet side oil temperature Tin is low, the electronic control unit 50 decreases the supply oil quantity V1 by causing the LUB opening degree to become lower than in a case where the inlet side oil temperature Tin is high. Then, the temperature increment ΔT in the transmission oil 6 in the heat exchanger 42 increases and the viscosity of the transmission oil 6 supplied to the lubricated portion 46 decreases, and thus the dragging loss in the transmission 3 is reduced. In addition, an early warm-up of the transmission 3 becomes possible and, for example, lock-up control can be allowed in an earlier stage. As a result, fuel efficiency is improved.

The oil quantity required for the lubrication of the lubricated portion 46 is smaller in a case where the temperature of the transmission oil 6 is low than in a case where the temperature of the transmission oil 6 is high. In FIG. 8, the horizontal axis represents viscosity×speed/surface pressure and the vertical axis represents a coefficient of friction. The viscosity is the viscosity of the transmission oil 6. The speed is the sliding speed of a sliding portion such as the gear meshing portion. The surface pressure is the surface pressure of the sliding portion such as the gear meshing portion. The viscosity of the transmission oil 6 has a larger value in a case where the T/M oil temperature is low (for example, range B in FIG. 8) than in a case where the T/M oil temperature is high (for example, range A in FIG. 8). In other words, the coefficient of friction of the sliding portion is lower in a case where the T/M oil temperature is low than in a case where the temperature is high given the same speed and the same surface pressure of the sliding portion.

The lubrication state of range B is closer to fluid lubrication than the lubrication state of range A is, and thus the oil film in the sliding portion is maintained and the coefficient of friction is unlikely to change even when the flow rate of the transmission oil 6 supplied to the lubricated portion 46 is decreased. When the flow rate of the transmission oil 6 supplied to the lubricated portion 46 is decreased, the oil level of the lubricated portion 46 is lowered and the stirring loss and the dragging loss can be reduced. In other words, the electronic control unit 50 decreases the flow rate of the transmission oil 6 supplied to the lubricated portion 46 in a case where the inlet side oil temperature Tin is low so that the overall loss in the transmission 3 can be reduced, based on the reduction in oil stirring loss and dragging loss, despite a slight increase in gear meshing loss.

Range A has a mixed lubrication region close to boundary lubrication and a boundary lubrication region. In range A, the flow rate of the transmission oil 6 supplied to the lubricated portion 46 can be increased so that the oil film of the gear meshing portion is maintained and the coefficient of friction of a tooth surface is reduced. Since the T/M oil temperature is high in range A, the oil stirring loss is unlikely to increase even when a large quantity of oil is supplied to the lubricated portion 46. In other words, the gear meshing loss can be reduced, the overall loss in the transmission 3 can be reduced, and fuel efficiency can be improved when the electronic control unit 50 increases the flow rate of the transmission oil 6 supplied to the lubricated portion 46 in a case where the inlet side oil temperature Tin is high.

During a transition from range A toward range B, the lubrication state becomes closer to the fluid lubrication and the coefficient of friction of the sliding portion decreases. Accordingly, it is conceivable that both the gear meshing loss and the oil stirring loss can be reduced when the flow rate of the transmission oil 6 supplied to the lubricated portion 46 is decreased in response to a decrease in the inlet side oil temperature Tin (increase in the viscosity of the transmission oil 6).

It is preferable that the electronic control unit 50 increases the opening degree θ of the oil quantity control valve 41 in the case of, for example, the T/M oil temperature at which the lubrication state of the sliding portion is the boundary lubrication and decreases the opening degree θ in the case of the T/M oil temperature at which the lubrication state of the sliding portion is the mixed lubrication to below the opening degree θ in the case of the T/M oil temperature at which the lubrication state of the sliding portion is the boundary lubrication. It is preferable that the electronic control unit 50 increases the opening degree θ as the T/M oil temperature increases in the temperature zone of the boundary lubrication. It is preferable that the electronic control unit 50 decreases the opening degree θ as the T/M oil temperature decreases in the temperature zone of the mixed lubrication.

The electronic control unit 50 according to this embodiment calculates a required opening degree θreq of the oil quantity control valve 41 in accordance with the T/M oil temperature. The required opening degree θreq is the opening degree θ reflecting a required flow rate Vreq that is the minimum flow rate of the transmission oil 6 required for the lubrication of the lubricated portion 46. In other words, in a case where the opening degree θ of the oil quantity control valve 41 is the required opening degree θreq, the value of the flow rate V1 of the transmission oil 6 flowing from the inflow port 41a to the supply port 41b can be the required flow rate Vreq. The required flow rate Vreq is, for example, a flow rate that allows the coefficient of friction of the sliding portion of the lubricated portion 46 to become equal to or lower than a predetermined value. In principle, the electronic control unit 50 turns the opening degree θ of the oil quantity control valve 41 into the required opening degree θreq reflecting the T/M oil temperature.

The electronic control unit 50 according to this embodiment adjusts the opening degree of the oil quantity control valve 41 so that the flow rate of the transmission oil 6 flowing to the heat exchanger 42 is at least the lower limit flow rate for performing heat exchange in the heat exchanger 42. As illustrated in FIG. 5, the heat exchange amount is changed in accordance with the flow rate of the transmission oil 6 in the heat exchanger 42. As illustrated in FIG. 6, the outlet side oil temperature Tout can be increased as the flow rate of the transmission oil 6 flowing to the heat exchanger 42 is decreased. In a case where the flow rate of the transmission oil 6 is excessively low, however, the transmission oil 6 is mixed with bubbles in the oil passage for heat exchange in the heat exchanger 42 and the heat exchange efficiency is reduced compared to a case where the bubbles are not present. In this embodiment, the minimum flow rate at which the generation of the bubbles can be prevented in the oil passage of the transmission oil 6 in the heat exchanger 42 is referred to as a lower limit flow rate Vmin. In other words, the lower limit flow rate Vmin is the lower limit value of the flow rate at which the oil passage of the transmission oil 6 in the heat exchanger 42 is filled with the transmission oil 6.

FIG. 9 illustrates an example of the lower limit flow rate Vmin. When the lower limit flow rate Vmin exceeds the inflow amount of the transmission oil 6 to the heat exchanger 42, the state of the flow of the transmission oil 6 in the heat exchanger 42 is unstable and the heat exchange amount may change. When the lower limit flow rate Vmin does not exceed the inflow amount of the transmission oil 6 to the heat exchanger 42, in contrast, the state of the flow of the transmission oil 6 in the heat exchanger 42 is stable and the heat exchange amount is unlikely to change.

In this embodiment, the opening degree of the oil quantity control valve 41 at which the supply oil quantity V1 is the lower limit flow rate Vmin is referred to as the lower limit opening degree θmin. The electronic control unit 50 according to this embodiment performs guard processing on a command value for the opening degree of the oil quantity control valve 41 and maintains the command value for the opening degree at a value equal to or higher than the lower limit opening degree θmin. In a case where the lower limit opening degree θmin exceeds the required opening degree θreq, the electronic control unit 50 turns the opening degree θ of the oil quantity control valve 41 into the lower limit opening degree θmin. Then, heat can be efficiently moved from the engine oil 5 to the transmission oil 6 in the heat exchanger 42 and the loss in the lubricated portion 46 can be reduced.

A method for determining the opening degree command value for the oil quantity control valve 41 according to this embodiment will be described with reference to the flowchart in FIG. 10. The control flow that is illustrated in FIG. 10 is repeatedly executed at predetermined intervals.

Firstly, in Step S10, the required opening degree θreq is calculated from the oil temperature by the electronic control unit 50. The required opening degree θreq is the opening degree reflecting the required flow rate Vreq that is the minimum flow rate of the transmission oil 6 required for the lubrication of the lubricated portion 46. The electronic control unit 50 according to this embodiment calculates the required opening degree θreq based on the map of the LUB opening degree illustrated in FIG. 7. The map of the LUB opening degree is determined in advance based on, for example, the correspondence relationship between the lubrication state and the viscosity (T/M oil temperature) illustrated in FIG. 8. The electronic control unit 50 calculates the required opening degree θreq based on the T/M oil temperature acquired from the oil temperature sensor 51 and the map illustrated in FIG. 7. The processing proceeds to Step S20 after the calculation of the required opening degree θreq.

In Step S20, the electronic control unit 50 determines whether or not the required opening degree θreq is at least the lower limit opening degree θmin. The electronic control unit 50 determines whether or not the required opening degree θreq calculated in Step S10 is at least the lower limit opening degree θmin determined in advance. In a case where the required flow rate Vreq exceeds the lower limit flow rate Vmin as illustrated in FIG. 6, for example, the following expression (1) is satisfied and a positive determination is made in Step S20. The processing proceeds to Step S30 in a case where it is determined as a result of the determination in Step S20 that the required opening degree θreq is at least the lower limit opening degree θmin (Step S20-Y). Otherwise (Step S20-N), the processing proceeds to Step S40.

$$\theta min \leq \theta req \qquad (1)$$

In Step S30, the electronic control unit 50 turns the required opening degree θreq into an opening degree command value θcom for the oil quantity control valve 41. The electronic control unit 50 uses the value of the required opening degree θreq calculated in Step S10 as the opening degree command value θcom. The processing proceeds to Step S50 after the execution of Step S30.

In Step S40, the electronic control unit 50 turns the lower limit opening degree θmin into the opening degree command value θcom for the oil quantity control valve 41. The electronic control unit 50 uses the value of the lower limit opening degree θmin as the opening degree command value θcom. The processing proceeds to Step S50 after the execution of Step S40.

In Step S50, the opening degree command value θcom is output by the electronic control unit 50. The electronic control unit 50 outputs the opening degree command value θcom to the oil quantity control valve 41. The oil quantity control valve 41 adjusts the opening degree θ of the valve to the opening degree command value θcom with the actuator. This control flow is terminated after the execution of Step S50.

As described above, the lubrication control device 1 according to this embodiment has the oil quantity control valve 41 that is disposed on the further upstream side than the heat exchanger 42. The first bypass oil passage 45, which allows the flow of the transmission oil 6 bypassing the heat exchanger 42 and the lubricated portion 46, is connected to the discharge port 41c of the oil quantity control valve 41. Accordingly, mixing between the transmission oil 6 discharged from the discharge port 41c and the transmission oil 6 warmed by the heat exchanger 42 is inhibited. Accordingly, the high-temperature transmission oil 6 can be promptly supplied to the lubricated portion 46 during the warm-up and the loss of the transmission 3 can be reduced.

The electronic control unit 50 of the lubrication control device 1 according to this embodiment controls the opening degree θ of the oil quantity control valve 41 so that the flow rate of the transmission oil 6 flowing from the inflow port 41a to the supply port 41b is lower in a case where the temperature of the transmission oil 6 is low than in a case where the temperature of the transmission oil 6 is high. It is preferable that the bypass valve 44 remains in the closed state in the T/M oil temperature range where the opening degree θ is changed, that is, in the temperature range between the low temperature side boundary temperature Td and the high temperature side boundary temperature Tu illustrated in FIG. 7. Then, the flow rate of the transmission oil 6 flowing into the heat exchanger 42 can be controlled by the oil quantity control valve 41. With the lubrication control device 1 according to this embodiment, the temperature increment ΔT in the transmission oil 6 during the warm-up of the transmission 3 can be increased to the maximum extent possible. In addition, the stirring loss and the dragging loss can be reduced when the oil quantity of the transmission oil 6 supplied to the lubricated portion 46 is decreased in a case where the T/M oil temperature is low.

In addition, the electronic control unit 50 according to this embodiment turns the opening degree θ of the oil quantity control valve 41, based on the temperature of the transmission oil 6, into the required opening degree θreq reflecting the required flow rate Vreq that is the minimum flow rate of the transmission oil 6 required for the lubrication of the lubricated portion 46. Accordingly, the stirring loss can be reduced while the lubrication state of the lubricated portion 46 is appropriately maintained. In a case where the lower limit opening degree θmin exceeds the required opening degree θreq, the electronic control unit 50 turns the opening degree θ of the oil quantity control valve 41 into the lower limit opening degree θmin. Accordingly, the heat exchange in the heat exchanger 42 can be appropriately performed and the warm-up of the transmission 3 can be promoted.

In the lubrication control device 1 according to this embodiment, the transmission oil 6 passing through the heat exchanger 42 is supplied to the lubricated portion 46 in its entirety. Accordingly, the heat that is received by the transmission oil 6 in the heat exchanger 42 can be effectively used for the warm-up of the lubricated portion 46. Since the oil quantity control valve 41 is arranged on the further upstream side than the heat exchanger 42, only the minimally required transmission oil 6 supplied to the lubricated portion 46 can be allowed to flow to the heat exchanger 42 and the lubricated portion 46 side. Since only the minimally required amount of transmission oil 6 flows into the heat exchanger 42, the outlet side oil temperature Tout can be increased to the maximum extent possible. In addition, the pressure loss in the heat exchanger 42 is reduced since the minimally required amount of transmission oil 6 flows into the heat exchanger 42.

An estimated value based on the result of the detection by the oil temperature sensor 51 may be used as the T/M oil temperature. In a case where the lock-up clutch 7a is in the released state as illustrated in FIG. 2, for example, the transmission oil 6 sent out by the oil pump 62 reaches the lubrication circuit 4 through an inner portion of the torque converter 7. In this case, the electronic control unit 50 may estimate the inlet side oil temperature Tin by estimating the amount of change in the oil temperature of the transmission oil 6 in the torque converter 7.

Second Embodiment

Figure 11:
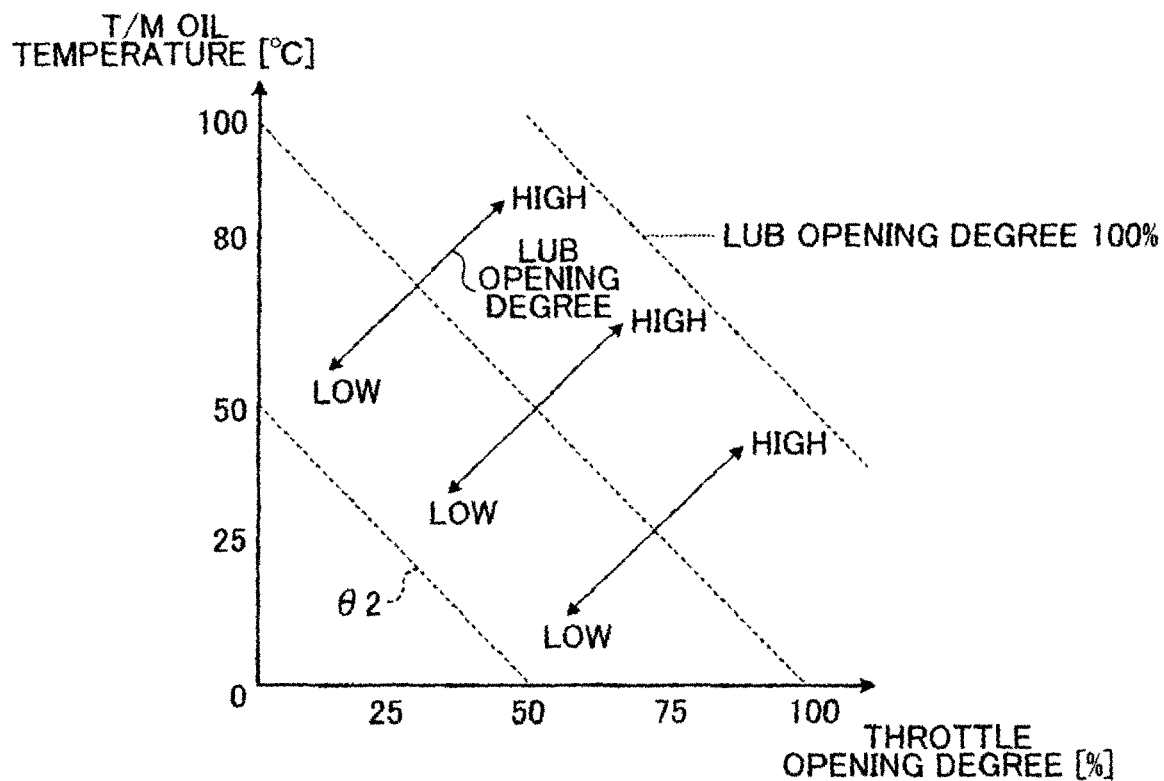
FIG. 11 is a diagram illustrating a map of the opening degree of an oil quantity control valve according to a second embodiment.
Figure 12:
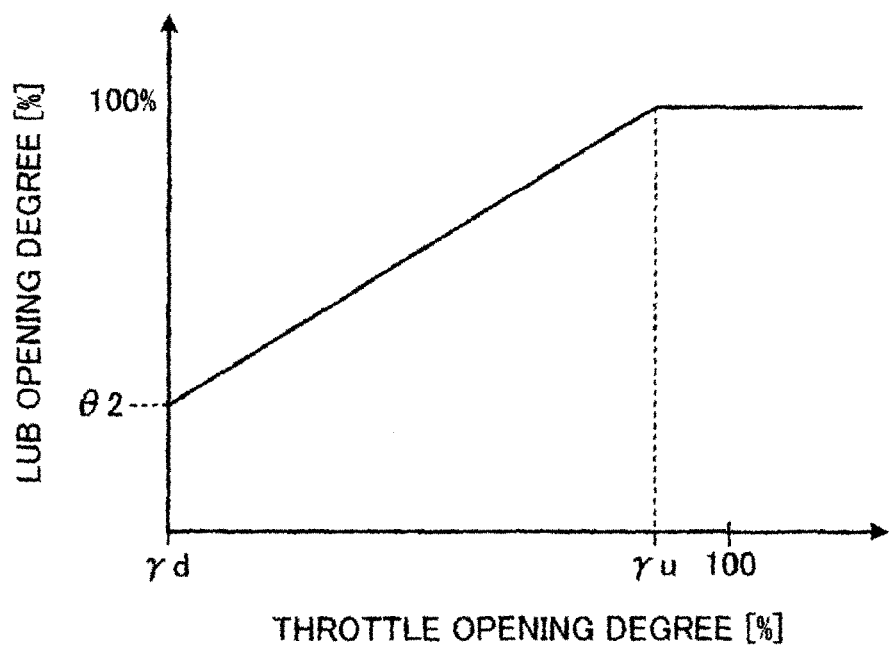
FIG. 12 is a diagram illustrating a relationship between a throttle opening degree and the opening degree of the oil quantity control valve pertaining to a case where a T/M oil temperature is constant.

A second embodiment will be described with reference to FIGS. 11 and 12. In the following description of the second embodiment, the same reference numerals will be used to refer to components that have similar functions to those in the description of the first embodiment and description thereof will be omitted. FIG. 11 is a diagram illustrating a map of the opening degree of an oil quantity control valve according to the second embodiment and FIG. 12 is a diagram illustrating a relationship between a throttle opening degree and the opening degree θ of the oil quantity control valve pertaining to a case where the T/M oil temperature is constant. The second embodiment differs from the first embodiment in that the opening degree command value θcom for the oil quantity control valve 41 is changed based on the throttle opening degree as well as the temperature of the transmission oil 6.

As illustrated in FIG. 11, the opening degree θ of the oil quantity control valve 41 (required opening degree θreq) is, as in the first embodiment, an opening degree that is lower in a case where the T/M oil temperature is low than in a case where the T/M oil temperature is high in the case of a comparison on the condition that the throttle opening degree is constant. The opening degree θ of the oil quantity control valve 41 according to the second embodiment (required opening degree θreq) is the opening degree value equal to those in a case where the T/M oil temperature is constant, a case where the throttle opening degree is low, and a case where the throttle opening degree is high or the opening degree value smaller than that in a case where the throttle opening degree is high. In other words, the electronic control unit 50 controls the opening degree θ of the oil quantity control valve 41 so that the supply oil quantity V1 pertaining to a case where the throttle opening degree is low does not exceed the supply oil quantity V1 pertaining to a case where the throttle opening degree is high.

In this embodiment, the opening degree θ [%] of the oil quantity control valve 41 has a maximum value of 100 and a minimum value of θ2. In other words, the minimum value θ2 is selected as the required opening degree θreq in the region on the further starting point side than the line of the dashed line of the minimum value θ2. FIG. 12 shows the relationship between the throttle opening degree and the opening degree θ (required opening degree θreq) of the oil quantity control valve 41 pertaining to a case where the T/M oil temperature is constant. In a case where the throttle opening degree is in the opening degree range between a lower limit throttle opening degree γd and an upper limit throttle opening degree γu, the value of the opening degree θ linearly changes in accordance with a change in the throttle opening degree. The value of the opening degree θ is the minimum value θ2 [%] in a case where the throttle opening degree is equal to or lower than the lower limit throttle opening degree γd. The value of the opening degree θ is 100 [%] in a case where the throttle opening degree is equal to or higher than the upper limit throttle opening degree γu.

The lubrication control device 1 according to the second embodiment turns the opening degree θ of the oil quantity control valve 41 into a low value, even at the same T/M oil temperature, in a case where the value of the throttle opening degree is low and a load on the lubricated portion 46 is small. Then, the stirring loss can be reduced and total efficiency can be improved while the lubrication state of the lubricated portion 46 is appropriately maintained. In a case where the throttle opening degree has a high value and the lubricated portion 46 has a large load, the lubrication control device 1 turns the opening degree θ of the oil quantity control valve 41 into a high value. Then, the lack of lubrication is inhibited in the lubricated portion 46 and the total efficiency can be improved.

The opening degree θ of the oil quantity control valve 41 may be adjusted in accordance with another parameter showing the load on the lubricated portion 46 instead of the throttle opening degree. For example, the opening degree θ of the oil quantity control valve 41 may be adjusted based on a parameter reflecting a required driving force such as an accelerator opening degree and a parameter reflecting a required braking force such as a brake operation amount.

(Regarding preferred relationship between kinematic viscosity of oil and torque loss) It is preferable that the lubrication control devices according to the first embodiment and the second embodiment are applied, for example, to a vehicle that has the relationship between the kinematic viscosity of oil and a torque loss which will be described below with reference to FIG. 13.

Figure 13:
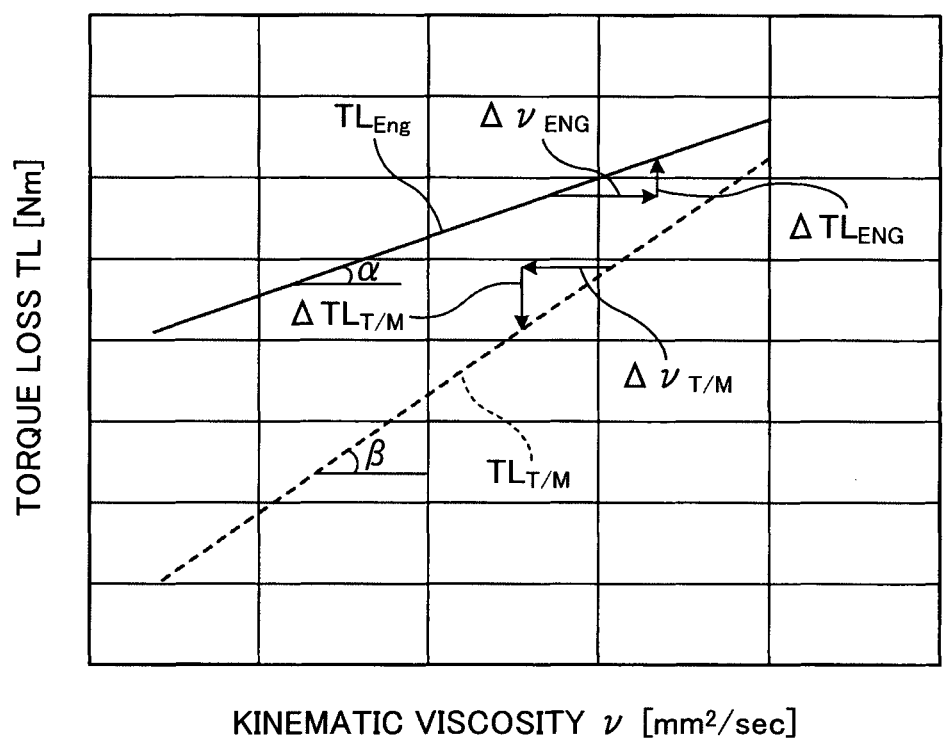
FIG. 13 is a diagram illustrating an example of a relationship between the kinematic viscosity of oil and a torque loss.

In FIG. 13, the horizontal axis represents the kinematic viscosity ν [mm²/sec] and the vertical axis represents the torque loss TL [Nm]. A torque loss $TL_{ENG}$ of the engine 2 shows a correspondence relationship between the value of a kinematic viscosity $v_{ENG}$ of the engine oil 5 and the magnitude of the torque loss of the engine 2. The kinematic viscosity ν [mm²/sec] is defined by the following equation (2). Herein, δ represents viscosity [Pa·sec] and ρ represents density [kg/m³].

$$v=\delta/\rho \tag{2}$$

The line that shows the torque loss $TL_{ENG}$ of the engine 2 according to this embodiment is, for example, a straight line that is obtained by performing linear approximation (primary approximation) on the value of the torque loss which is calculated from the actually measured value of an engine torque. The torque loss $TL_{ENG}$ of the engine 2 is, for example, the differential torque between a theoretical output torque of the engine 2 and an actual output torque of the engine 2. The theoretical output torque of the engine 2 is, for example, the output torque of the engine 2 pertaining to a case where the value of the kinematic viscosity of the engine oil 5 is assumed to be zero, that is, the output torque of the engine 2 pertaining to a case where the dragging loss attributable to the viscosity of the engine oil 5 or the like is assumed to be absent.

It is preferable that the line of the torque loss TL is what is obtained by approximating an actually measured value (or a simulation-based calculated value) in a predetermined temperature range. Examples of the predetermined temperature range include an assumed environmental temperature range, a regular-use region temperature range, and a temperature range determined in mode traveling for fuel efficiency calculation. The predetermined temperature range has a lower limit value of, for example, 25° C. or 0° C. The upper limit value of the predetermined temperature range is, for example, a steady temperature or a warm-up completion threshold temperature, examples of which may include 80° C. The upper limit value of the predetermined temperature range is the application limit temperature of the oil 5, 6, examples of which may include 120° C.

When the temperature of the engine oil 5 is lowered as a result of the heat exchange by the heat exchanger 42, the kinematic viscosity $v_{ENG}$ of the engine oil 5 increases. An increment $\Delta TL_{ENG}$ in the torque loss of the engine 2 is determined in accordance with an increment $\Delta v_{ENG}$ in the kinematic viscosity resulting from the temperature reduction. The magnitude $|\Delta TL_{ENG}/\Delta v_{ENG}|$ of the increment in the torque loss in the engine 2 per unit increment in the kinematic viscosity of the engine oil 5 can be obtained as Tanα from the slope α of the torque loss $TL_{ENG}$. In the following description, the degree of the change in the torque loss in the engine 2 with respect to the change in the kinematic viscosity of the engine oil 5 will be referred to as the "torque loss sensitivity Tanα of the engine 2".

The torque loss $TL_{T/M}$ of the transmission 3 shows a correspondence relationship between the value of the kinematic viscosity $v_{T/M}$ of the transmission oil 6 and the magnitude of the output torque of the transmission 3. The torque loss $TL_{T/M}$ of the transmission 3 is, for example, the differential torque between the input torque and the output torque of the transmission 3. The line that shows the torque loss $TL_{T/M}$ of the transmission 3 is, for example, a straight line that is obtained by performing linear approximation on the value of the torque loss which is calculated from the actually measured values of the input torque and the output torque of the transmission 3.

The kinematic viscosity $v_{T/M}$ of the transmission oil 6 decreases when the temperature of the transmission oil 6 rises as a result of the heat exchange in the heat exchanger 42. A decrement $\Delta TL_{T/M}$ in the torque loss of the transmission 3 is determined in accordance with a decrement $\Delta v_{T/M}$ in the kinematic viscosity resulting from the temperature rise. The magnitude $|\Delta TL_{T/M}/\Delta v_{T/M}|$ of the decrement in the torque loss in the transmission 3 per unit decrement in the kinematic viscosity of the transmission oil 6 can be obtained as Tanβ from the slope β of the torque loss $TL_{T/M}$. In the following description, the degree of the change in the torque loss in the transmission 3 with respect to the change in the kinematic viscosity of the transmission oil 6 will be referred to as the "torque loss sensitivity Tanβ of the transmission 3".

In general, the engine oil temperature rises more rapidly than the T/M oil temperature in a case where the engine 2 is operated in, for example, a cold start. In other words, the engine oil temperature has a temperature higher than the T/M oil temperature. Accordingly, during the warm-up, heat is transferred from the engine oil 5 to the transmission oil 6 in the heat exchanger 42. This heat exchange causes the engine oil temperature to become lower than in a case where the heat exchange is not performed and causes the torque loss of the engine 2 to increase. The T/M oil temperature rises compared to a case where the heat exchange is not performed, and the torque loss of the transmission 3 is reduced.

According to the vehicle characteristics illustrated in FIG. 13, the torque loss sensitivity Tanβ of the transmission 3 exceeds the torque loss sensitivity Tanα of the engine 2. Accordingly, the magnitude of the decrement $\Delta TL_{T/M}$ in the torque loss of the transmission 3 reflecting the decrease in the kinematic viscosity $v_{T/M}$ resulting from the rise in the T/M oil temperature attributable to the heat exchange in the heat exchanger 42 exceeds the magnitude of the increment $\Delta TL_{ENG}$ in the torque loss of the engine 2 reflecting the increase in the kinematic viscosity $v_{ENG}$ resulting from the reduction in the engine oil temperature attributable to the heat exchange. As a result, the magnitude of a total torque loss $TL_{TTL}$ combining the torque loss $TL_{ENG}$ of the engine 2 with the torque loss $TL_{T/M}$ of the transmission 3 can be reduced.

When the heat exchange between the transmission oil 6 and the engine oil 5 is performed in the heat exchanger 42 in the vehicle that has the characteristics described above, the total torque loss $TL_{TTL}$ during the warm-up can be reduced compared to a case where the heat exchange is not performed. In addition, the total torque loss $TL_{TTL}$ can be minimized when the supply oil quantity V1 allowed to flow to the heat exchanger 42 side by the oil quantity control valve 41 is appropriately controlled. For example, the T/M oil temperature of the lubricated portion 46 can be raised in an early stage while a delay in the rise in the oil temperature of the engine oil 5 is reduced when the supply oil quantity V1 is decreased while the T/M oil temperature is low.

First Modification Example of Each Embodiment

A first modification example of the first embodiment and the second embodiment will be described. In the first embodiment and the second embodiment, the liquid-phase medium that exchanges heat with the transmission oil 6 in the heat exchanger 42 is the engine oil 5. Instead, however, heat exchange may be carried out between the transmission oil 6 and the coolant 9 in the heat exchanger 42. Alternatively, both the heat exchange between the transmission oil 6 and the engine oil 5 and the heat exchange between the transmission oil 6 and the coolant 9 may be carried out in the heat exchanger 42.

In a case where the heat exchanger 42 performs heat exchange between the transmission oil 6 and the coolant 9 and the T/M oil temperature is high, the transmission oil 6 is cooled by the coolant 9. In the lubrication control device 1 according to each embodiment described above, the cooling performance in cooling the transmission oil 6 is improved since the supply oil quantity V1 is increased by the electronic control unit 50 as the T/M oil temperature increases. The electronic control unit 50 maintains the bypass valve 44 in the closed state in a case where the cooling of the transmission oil 6 is executed in the heat exchanger 42.

Second Modification Example of Each Embodiment

In the first embodiment and the second embodiment, the first bypass oil passage 45 connects the discharge port 41c and the oil pan 61 to each other. However, the destination of the connection by the first bypass oil passage 45 is not limited to the oil pan 61 insofar as the heat exchanger 42 and the lubricated portion 46 are bypassed. For example, the first bypass oil passage 45 may be connected to the intake oil passage 63a as is the case with the return oil passage 63k. In this case, it is preferable that a check valve similar to the check valve 72 is disposed in the first bypass oil passage 45.

Third Modification Example of Each Embodiment

In the first embodiment and the second embodiment, the opening degree θ of the oil quantity control valve 41 linearly changes with respect to the change in the T/M oil temperature in a case where the T/M oil temperature is higher than the low temperature side boundary temperature Td. In the second embodiment, the opening degree θ of the oil quantity control valve 41 linearly changes with respect to the change in the throttle opening degree in a case where the throttle opening degree exceeds the lower limit throttle opening degree γd. However, the opening degree θ may change in steps instead of linearly changing as described above. For example, the electronic control unit 50 may change the opening degree θ in steps in a low temperature side region of the T/M oil temperature so that the supply oil quantity V1 becomes smaller than in a high temperature side region. The electronic control unit 50 may change the opening degree θ in steps in a small opening degree region of the throttle opening degree so that the supply oil quantity V1 becomes smaller than in a large opening degree region.

The opening degree θ of the oil quantity control valve 41 may change continuously and nonlinearly instead of linearly changing. Referring to the map illustrated in FIG. 7, the opening degree θ may change to draw a curve convex to the axial side (lower side) of the inlet side oil temperature Tin and a curve convex to the axial side (upper side) of the LUB opening degree in the temperature range between the low temperature side boundary temperature Td and the high temperature side boundary temperature Tu. Referring to the map illustrated in FIG. 12, the opening degree θ may change to draw a curve convex to the axial side of the throttle opening degree and a curve convex to the axial side of the LUB opening degree in the opening degree range between the lower limit throttle opening degree γd and the upper limit throttle opening degree γu.

Fourth Modification Example of Each Embodiment

The transmission 3 to which the lubrication control device 1 according to each embodiment described above can be applied is not limited to a so-called AT. The transmission 3 may be, for example, a stepped transmission and a continuously variable transmission other than the AT. In addition, the transmission 3 may be a transmission in which the operation of a part such as a clutch operation is carried out automatically or may be a manual transmission.

The content disclosed in each of the embodiments and the modification examples described above can be appropriately combined with each other in execution.

The invention claimed is:

1. A lubrication control device for a transmission, the lubrication control device comprising:
   an oil pump configured to send out oil to the transmission;
   a heat exchanger connected between the oil pump and a lubricated portion of the transmission, the heat exchanger being configured to perform heat exchange between the oil and a liquid-phase medium circulating in an engine;
   an oil quantity control valve including an inflow port, a supply port, and a discharge port, the inflow port being configured to allow the oil sent out from the oil pump to flow into the inflow port, the supply port being connected to the heat exchanger, and the oil quantity control valve being configured to control a supply oil quantity as a flow rate of the oil flowing from the inflow port to the supply port and discharge a residue of the oil from the discharge port;
   a first bypass oil passage connected to the discharge port, the first bypass oil passage being configured to allow the flow of the oil bypassing the lubricated portion; and
   an electronic control unit configured to adjust an opening degree of the oil quantity control valve such that the supply oil quantity increases as a temperature of the oil increases.

2. The lubrication control device according to claim 1, wherein the electronic control unit is configured to adjust the opening degree of the oil quantity control valve to a required opening degree based on the temperature of the oil, the required opening degree being an opening degree of the oil quantity control valve reflecting a minimum flow rate of the oil required for the lubrication of the lubricated portion, and
   wherein the electronic control unit is configured to adjust the opening degree of the oil quantity control valve into a lower limit opening degree in a case where the lower limit opening degree exceeds the required opening degree, the lower limit opening degree being an opening degree of the oil quantity control valve reflecting a lower limit flow rate of the oil for performing the heat exchange in the heat exchanger.

3. The lubrication control device according to claim 1, wherein the electronic control unit is configured to change the opening degree of the oil quantity control valve in accordance with the temperature of the oil in a case where the temperature of the oil is higher than a low temperature side boundary temperature, and
   wherein the electronic control unit is configured to maintain the opening degree of the oil quantity control valve at a constant opening degree in a case where the temperature of the oil is equal to or lower than the low temperature side boundary temperature.

4. The lubrication control device according to claim 3, wherein the low temperature side boundary temperature is the lowest oil temperature assumed in a case where a vehicle is used in a general environment.

5. The lubrication control device according to claim 1, wherein the electronic control unit is configured to control the opening degree of the oil quantity control valve such that the supply oil quantity increases as a throttle opening degree increases.

6. The lubrication control device according to claim 1, further comprising:
- a second bypass oil passage configured to connect the oil quantity control valve side of the heat exchanger and the lubricated portion side of the heat exchanger to each other; and
- a bypass valve configured to control the flow of the oil in the second bypass oil passage,
- wherein the electronic control unit is configured to control the bypass valve such that the bypass valve is closed in a case where the temperature of the oil is lower than a predetermined value and the bypass valve is opened in a case where the temperature of the oil is equal to or higher than the predetermined value.

\* \* \* \* \*